United States Patent
Shibata et al.

[15] 3,678,161
[45] July 18, 1972

[54] GANGTOKMYCIN AND PRODUCTION THEREOF BY STREPTOMYCES GANGTOKENSIS

[72] Inventors: Motoo Shibata, Toyonaka; Hiroichi Yamamoto, Kobe; Eiji Higashide, Takarazuka; Komei Mizuno, Osaka; Mashiko Imanishi, Takarazuka; Akira Miyake, Nishinomiya, all of Japan

[73] Assignee: Takeda Chemical Industries, Ltd., Osaka, Japan

[22] Filed: Oct. 20, 1964

[21] Appl. No.: 405,134

[30] Foreign Application Priority Data

Oct. 24, 1963  Japan..................................38/56946

[52] U.S. Cl............................................................424/122
[51] Int. Cl. .......................................................A61k 21/00
[58] Field of Search..................167/65 AB; 195/80; 424/122

[56] References Cited

OTHER PUBLICATIONS

Waksman et al. The Actionmycetes, Vol. 3, The Williams & Wilkins Co. 1962 Pp. 334– 335. QR82A35W3a

*Primary Examiner*—Albert T. Meyers
*Assistant Examiner*—Daren M. Stephens
*Attorney*—Wenderoth, Lind & Ponack

[57] ABSTRACT

Gangtokmycin, produced by culturing *Streptomyces gangtokensis* No. 69249 (ATCC-15665) under aerobic conditions, shows antimicrobial activity against gram-positive bacteria and antifungal activity against phytopathogenic fungi. It is useful in treating candidosis, Cryptococcus diseases, athlete's foot, etc. and also as an agricultural chemical for Helminthosporium leaf spot, late blight, smut, etc. without phytotoxicity.

2 Claims, 2 Drawing Figures

Patented July 18, 1972

WAVELENGTH (MICRONS)

TRANSMITTANCE (%)

Motoo Shibata,
Hiroichi Yamamoto,
Eiji Higashide,
Kōmei Mizuno,
Masahiko Imanishi
and Akira Miyake
INVENTORS BY Wenderoth, Lind
and Ponack,
attorneys

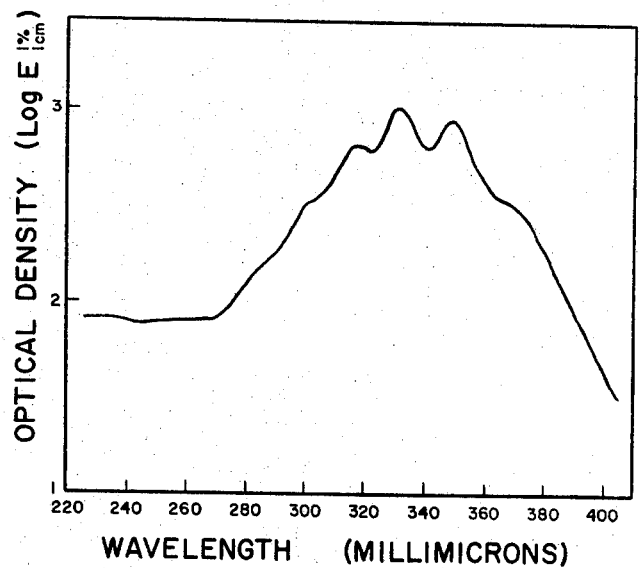
Fig-2-

GANGTOKMYCIN AND PRODUCTION THEREOF BY STREPTOMYCES GANGTOKENSIS

The new antibiotic has been named "Gangtokmycin."

In the method of the present invention, microorganisms which belong to the genus Streptomyces and can produce Gangtokmycin are employed. These microorganisms comprise for example (a) *Streptomyces gangtokensis* Nov. sp. which has been isolated from the soil at Osaka, Japan and named as above by the present inventors, and (b) mutants and variants thereof.

The microbial characteristics of *Streptomyces gangtokensis* Nov. sp. are as follows. In the following characteristics, the color names designated "Rdg." are based on Ridgway's Color Standard and Nomenclature.

A. Morphological characteristics:

Sporophores show monopodical branching and form many spirals. Spores, chains oval, 0.9–1.4 × 1.4–2.2 $\mu$, arranged in chains. The surface of spores is smooth.

B. Characteristics on the cultures:

Aerial mycelia on various kinds of media are Gray to Drab Gray, and later interspersed with black, hygroscopic patches. *Streptomyces gangtokensis* produces brown to brownish black pigment on organic media, which is the characteristic of *Streptomyces gangtokensis* as compared to other microorganisms belonging to series "*Streptomyces hygroscopicus*."

1. Czapek's agar:
   Growth : Glossy, colorless growth.
   Aerial mycelium : Drab (Rdg., XLVI, 17′′′′).
   Soluble pigment : None.
2. Glucose Czapek's agar
   Growth : Chamois (Rdg., XXX, 19″–b).
   Aerial mycelium : Mouse Gray (Rdg., LI, 15′′′′′) to Light Drab (Rdg., XLVI, 17′′′′–b), later interspersed with black, hygroscopic patches.
   Soluble pigment : Chamois (Rdg., XXX, 19″–b).
3. Glycerol Czapek's agar
   Growth : Colorless or Cream Buff (Rdg., XXX, 19″–d), penetrating deep into the medium.
   Aerial mycelium : White to Mouse Gray.
   Soluble pigment : Chamois (Rdg., XXX, 19″–b).
4. Glucose asparagine agar:
   Growth : Colorless, flat.
   Aerial mycelium : Drab (Rdg., XLVI, 17′′′′), later interspersed with black, hygroscopic patches.
   Soluble pigment : None.
5. Bouillon:
   Growth : Colorless sediment.
   Soluble pigment : Brownish Black.
6. Bouillon agar:
   Growth : Colorless or Chamois (Rdg., XXX, 19″–b), wrinkled.
   Aerial mycelium : None.
   Soluble pigment : Light Brown.
7. Glycerol bouillon agar:
   Growth : Brown, wrinkled.
   Aerial mycelium : None.
   Soluble pigment : Brown.
8. Glucose bouillon agar:
   Growth : Thin, Chamois (Rdg., XXX, 19″–b) or Light Brown.
   Aerial mycelium : None.
   Soluble pigment : Light Brown.
9. Starch agar:
   Growth : Chamois (Rdg., XXX, 19″–b), flat growth, penetrating into the medium.
   Aerial mycelium : White, scant.
   Soluble pigment : Chamois (Rdg., XXX, 19″–b).
10. Whole egg:
    Growth : Colorless later Black, folded.
    Aerial mycelium : White, scant.
    Soluble pigment : None.
    Dark around the growth.
11. Yeast extract agar:
    Growth : Colorless, later Deep Brown, folded.
    Aerial mycelium : White to Drab.
    Soluble pigment : Deep Brown.
12. Carrot plug:
    Growth : Colorless, thin.
    Aerial mycelium : Drab, later interspersed with black, hygroscopic patches.
13. Potato plug:
    Growth : Dark Brown or Black, wrinkled.
    Aerial mycelium : None or scant, White.
    Soluble pigment : Brown or Dark Brown.
14. Skim milk : Coagulation, later Peptonization
15. Gelation:
    Liquefaction : Strong.
    Soluble pigment : Dark Brown to Blackish Brown.
16. Cellulose:
    No growth.
17. Calcium malate agar:
    Growth : Colorless or Yellow, center raised colonies, penetrating deep into the medium.
    Aerial mycelium : Smoke Gray (Rdg., XLVI, 21′′′′′–d) to Drab.
    Soluble pigment : None or Chamois (Rdg., XXX, 19″–b).
18. Tyrosinate agar:
    Growth : Thin, Chamois (Rdg., XXX, 19″–b).
    Aerial mycelium : None.
    Soluble pigment : None.
19. Peptone agar:
    Growth : Thin, Brown.
    Aerial mycelium : Scant, White.
    Soluble pigment : Brown.
20. Nitrate reduction: Reduction.
21. Hydrolysis of starch:
    Growth zone/Enzymatic zone = 16 – 18 millimeters/20 – 23 millimeters.

TABLE 1

Utilization of carbon sources observed by Pridham's method:

| | | | |
|---|---|---|---|
| Erythritol | – to ± | Melibiose | – to ± |
| Adonitol | – to ± | Maltose | +++ |
| D-Sorbitol | – to ± | Sucrose | – to ± |
| i-Inositol | – to ± | Lactose | – to ± |
| D-Mannitol | – to ± | Raffinose | – to ± |
| Dulcitol | – to ± | Trehalose | +++ |
| D-Xylose | – to ± | Salicin | – to ± |
| L-Arabinose | – to ± | Inulin | – to ± |
| L-Sorbose | – to ± | Dextran | – ± |
| D-Galactose | ++ | Sodium acetate | + |
| D-Glucose | +++ | Sodium succinate | + to ++ |
| D-Fructose | ++ | Sodium citrate | – to ± |
| Rhamnose | – to ± | Control | – to ± |

Remarks: +++: Heavy growth, ++: Good growth, +: Fair growth, ±: Faint growth, –: No growth.

Comparison of the above-mentioned microbial properties with the descriptions in "The Actinomycetes, Vol. 2," written by S. A. Waksman, published by The Williams and Wilkins Company in 1961, shows that *Streptomyces gangtokensis* appears to have very close resemblance to species of Series "*Streptomyces hygroscopicus*." Among the species belong to the Series hygroscopicus, only *Streptomyces limosus* forms melanin. *Streptomyces gangtokensis* also forms melanin and from this point *Streptomyces gangtokensis* appears to have close resemblance to *Streptomyces limosus*.

But soluble pigment produced by *Streptomyces limosus* on glycerol nitrate agar, glucose asparagine agar or calcium malate agar is light yellow such as lemon yellow, citron yellow or golden yellow. On the contrary, *Streptomyces gangtokensis* does not produce soluble pigment or, if it does produce soluble pigment, the latter is pale chamois.

As there is a clear difference in characteristics of producibility of soluble pigment between *Streptomyces gangtokensis* and *Streptomyces limosus*, *Streptomyces gangtokensis* is concluded to be a novel species belonging to the Series "*Streptomyces hygroscopicus*."

The microbial characteristics of actinomycetes, especially the genus Streptomyces, are not generally fixed and this applies also to the characteristics of the Gangtokmycin-producing-strains. Therefore, there are many mutants and variants of *Streptomyces gangtokensis* Nov. sp.

Among the mutants and variants of *Streptomyces gangtokensis*, regardless of whether the variation may be caused naturally or artificially, for example, with X-ray, ultraviolet-ray or by the action of chemical reagents, any one which can produce Gangtokmycin can be employed in the method of the preset invention.

In the method of the present invention, a Gangtokmycin-producing-strain belonging to the genus Streptomyces is incubated in a medium containing assimilable carbon sources, digestible nitrogen sources and other necessary nutrients. As the carbon sources, for example, starch, glucose, lactose, maltose, galactose, sucrose, dextrin, glycerol or millet jelly may be employed. As the nitrogen sources, for example, peptone, soybean powder, cornsteep liquor, meat extract, ammonium salts, organic or inorganic nitrogen compounds may be employed. Further, a small quantity of inorganic salts such as sodium chloride, phosphates, salts of metals such as calcium, zinc, manganese, iron may be added to the medium. And, if necessary, conventional nutrient factors or antifoaming agents such as animal oil, vegetable oil or mineral oil may be added.

For the culture of a Gangtokmycin-producing strain, submerged culture utilizing liquid medium is preferable. But, as occasion demands, shake culture may be employed. The culture conditions such as temperature, culture period and pH of the medium should be determined so that the production of Gangtokmycin may become maximum. When a submerged culture is employed, the production of Gangtokmycin becomes maximum generally under such conditions as at 24° to 30°C, at around neutral pH and for about 2 to 6 days. For example, when *Streptomyces gangtokensis* No. 69249 is cultured under shaking in a medium containing, by weight, 2 percent of glucose, 3 percent of starch, 0.5 percent of polypeptone, 1 percent of soybean powder, 1 percent of cornsteep liquor, 0.5 percent of sodium chloride and 0.5 percent of calcium carbonate at 28°C for 4 days, the antibacterial activity of the culture broth becomes 750 to 1,500 units per milliliter against *Candida albicans*. Gangtokmycin thus produced is contained not only in the liquid part of the culture broth, but also mostly in the mycelia. Gangtokmycin thus accumulated in the culture broth is recovered and refined in a desired purity by utilizing appropriate means with adequate consideration being given to the properties of Gangtokmycin, for example, differences between Gangtokmycin and the impurities in solubility, in distribution ratio between two liquid phases, in adsorbability, or in ion-coherence. For example, the following means are preferably used for the recovery of Gangtokmycin. The culture broth of a Gangtokmycin-producing strain is extracted with appropriate solvents. From the extract the solvents are removed to give residue. The residue is washed with appropriate solvents to give crude powder of Gangtokmycin. The crude powder of Gangtokmycin thus obtained, as occasion demands, is subjected to one or more of the above-described processes to give powder of Gangtokmycin of high purity. The solvents for extraction are, for example, alcohols such as methanol, ethanol, n-butanol, iso-amylalcohol, aqueous alcohols such as 80 percent methanol, 70 percent ethanol, aqueous butanol, pyridine or aqueous pyridine. The solvents for washing the residue may, for example, be acetone or petroleum ether.

The physico-chemical and biological properties of Gangtokmycin thus purified are as follows:

1. Elementary analysis:

| | Carbon (percent) | Hydrogen (percent) | Nitrogen (percent) |
|---|---|---|---|
| (I) | 63.06 | 8.78 | 1.21 |
| (II) | 63.70 | 8.39 | 1.34 |

2. Specific rotation:

$[\alpha]_D^{25} = 0°$ to $-13°$ ($c=0.5$ 1.0, in aqueous pyridine containing 20 percent by weight of water)

3. Absorption spectrum:

The infrared absorption spectrum of Gangtokmycin measured by the potassium bromide disk method is as shown in FIG. 1.

The significant absorption bands in microns are as follows:

| | |
|---|---|
| 2.97 (strong) | 7.70–7.50 (broad, middle) |
| 3.42 (strong) | 9.53–9.10 (broad, middle) |
| 5.88 (middle) | 9.96 (strong) |
| 6.14 (middle) | 10.3 (middle) |
| 6.35 (middle) | 10.9 (weak) |
| 6.45 (middle) | 11.4 (weak) |
| 7.00 (weak) | 11.8 (middle) |
| 7.25 (strong) | 12.9 (weak) |

The ultraviolet absorption spectrum of Gangtokmycin in methanol solution is as shown on FIG. 2.

The significant maximum absorptions observed are as follows:

| MeOH | |
|---|---|
| 317 m$\mu$ | ($E_{1cm}^{1\%} = 670$) |
| $\mu$ max | |
| 332 m$\mu$ | ($E_{1cm}^{1\%} = 960$) |
| 348 m$\mu$ | ($E_{1cm}^{1\%} = 840$) |

4. Color:
Light yellow.

5. Color reaction:

It is positive to Fehling reagent, Dragendorff reagent, Molisch reaction and the reaction for detection of phenolic or enolic hydroxyl group by using a solution consisting of equivolume of 1 percent aqueous ferric chloride solution and 1 per cent aqueous potassium ferricyanide solution. It is somewhat positive to ninhydrin reaction, but negative to Sakaguchi's reaction, aniline-phthalate reagent and silver mirror reaction. It shows purplish red with concentrated sulfuric acid.

6. Solubility:

It is easily soluble in aqueous methanol, aqueous ethanol, aqueous acetone, aqueous dioxane, aqueous pyridine, and soluble in N,N-dimethylformamide, pyridine, acetic acid, and sparingly soluble in methanol, ethanol, and insoluble or hardly soluble in water, pure acetone, ethyl acetate, chloroform, benzene, petroleum ether.

7. Rf values (paper partition chromatography):

The results obtained by paper partition chromatography measured using ascending method on "Whatman filter-paper No. 1" (W. and R. Balston Ltd., Great Britain) are as follows:

| Solvents | Rf value |
|---|---|
| n-Butanol·Acetone·Water (40:15:50) | 0.55–0.60 |
| n-Butanol·Methanol·Water (25:4:16) | 0.56–0.60 |
| n-Butanol·Acetone·Pyridine·Water (40:10:5:45 | 0.53–0.55 |

The ratio of the solvents is shown by volume.
8. Antibacterial spectra:
Antimicrobial activities of Gangtakmycin against various microorganisms are shown in table 2 to table 5.
The test is carried out at 37°C on 1 percent of glucose bouillon agar at pH 7 by agar dilution method for a period listed in the table 2.

TABLE 2

Antimicrobial spectra of *Gangtokmycin* shown by minimum inhibitory concentration (μg/ml)

| Test microorganisms | Time 24 | 48 | 72 | 86 |
|---|---|---|---|---|
| *Piricularia oryzae* | 10 | 15 | 30 | 30 |
| *Ophiobolus miyabeanus* | 7 | 7 | 15 | 30 |
| *Pellicularia filamentosa* f. sp. sasakii | – | 20 | 20 | 50 |
| *Fusarium oxysporum* f. lycopersici | 30 | 70 | 100 | >100 |
| *Rhizoctonia solani* | – | 20 | 20 | 30 |
| *Phytophthora infestans* | 3 | 5 | 5 | 5 |
| *Colletotrichum lagenarium* | – | 15 | 15 | 30 |
| *Phytophthora parasitica* | 20 | 30 | 70 | 100 |
| *Glomerella cingulata* | 10 | 15 | 30 | 50 |
| *Alternaria kikuchiana* | 10 | 15 | 15 | 30 |
| *Ustilago zeae* | 5 | 7 | 7 | 15 |
| *Candida albicans* | 1–0.5 | – | – | – |
| *Candida tropicalis* | 1–0.5 | – | – | – |
| *Candida pseudotropicalis* | 1–0.5 | – | – | – |
| *Candida krusei* | 1–0.5 | – | – | – |
| *Cryptococcus neoformans* | 0.2 | – | – | – |
| *Trichophyton rubrum* | 0.1 | – | – | – |
| *Trichophyton mentagrophytes* | 1 | – | – | – |
| *Trichophyton interdigitale* | 1–2 | – | – | – |
| *Trichophyton tonsurans* | 1–0.5 | – | – | – |

The minimum inhibitory concentration against the bacteria tested at 37°C on bouillon agar for 24 hours is shown in table 3.

TABLE 3

| Test bacteria | Minimum inhibitory concentration (mcg/ml) |
|---|---|
| *Escherichia coli* | 100 |
| *Proteus vulgaris* | 100 |
| *Staphylococcus aureus* | 2 |
| *Bacillus subtilis* | 1 |
| *Bacillus cereus* | 2 |
| *Bacillus brevis* | 2 |
| *Sarcina lutea* | 2 |
| *Micrococcus flavus* | 1 |

The minimum inhibitory concentration against the bacteria tested at 37°C on glycerol bouillon for 48 hours is shown in table 4.

TABLE 4

| Test bacteria | Minimum inhibitory concentration (mcg/ml) |
|---|---|
| *Mycobacterium* ATCC 607 | 50 |
| *Mycobacterium avium* | 50 |
| *Mycobacterium phlei* | 10 |
| *Mycobacterium smegmatis* | 10 |

The minimum inhibitory concentration against fungi tested at 28°C on glucose bouillon for 48 hours is shown in table 5.

TABLE 5

| Test fungi | Minimum inhibitory concentration (mcg/ml) |
|---|---|
| *Aspergillus niger* | 1–0.5 |
| *Penicillium chrysogenum* | 1 |

As is shown in table 2 to table 5, Gangtokmycin shows antimicrobial activities against pathogenic gram-positive bacteria and some fungi and yeasts.

9. Toxicity

The median lethal dose ($LD_{50}$) in mice is about 10 to 25 milligrams per kilogram of body weight when administered intraperitonearlly, and 400 to 600 milligrams per kilogram of body weight when orally administered.

On comparison of the above-mentioned physico-chemical and biological properties of Gangtokmycin with those of the hitherto-known antibiotics, Gangtokmycin is shown to be a novel antibiotic. Thus, from its ultraviolet absorption spectrum shown on FIG. 2, Gangtokmycin belongs to the pentaene antibiotics. Among hiterto-known series pentaene antibiotics, those which are active against gram-positive bacteria are "Pentaene Antifungal Antibiotics I" found by I. D. Steinman in 1958 and "Pentaene Antifungal Antibiotics II" found by R. Brown and E. L. Hazen in 1959. The descriptions of these known antibiotics are found in "The Actinomycetes" vol. 3, p. 334–335, written by S. A. Waksman and H. A. Lechevalier, published in 1962. On comparison of Gangtokmycin with them, the ultraviolet absorbancy of the Pentaene Antifungal Antibiotics I is lower than that of Gangtokmycin and the minimum inhibitory concentration against gram-positive bacteria of the Pentaene Antifungal Antibiotics II is considerably larger than that of Gangtokmycin. In view of these points, it is clear that Gangtokmycin is different from these known pentaene antibiotics and that it is a novel antibiotic.

As is shown in table 2, Gangtokmycin inhibits strongly the growth of microorganisms, especially those belonging to the genera Candida, Cryptococcus and Trychophyton and those of phytopathogenic fungi, e.g. *Ophiobolus miyabeanus*, *Phytophthora infestans* and *Ustilago zeae*. Gangtokmycin is, therefore, useful as inter alia an agricultural chemical for Helminthosporium leaf spot, late blight smut, etc. without phytotoxicity.

The following examples set forth presently-preferred exemplary embodiments of the present invention; these are intended to be solely illustrative, however, and not at all limitative of the invention.

In the present specification and the following examples, the abbreviations, mcg, mg, ml, l and °C refer to microgram, milligram, milliliter, liter and degrees centigrade, respectively, and percentages are on the weight basis unless otherwise noted.

EXAMPLE 1

*Streptomyces gangtokensis* No. 69249 (ATCC-15665) is cultured under shaking in an aqueous medium containing 2 percent of glucose, 0.5 percent of meat extract, 0.5 percent of polypeptone, 0.5 percent of sodium chloride and 0.5 percent of calcium carbonate at 28°C for 4 days. In the resulting culture broth, Gangtokmycin is produced and the broth shows antimicrobial activity of 750 units per milliliter against *Candida albicans*, and of 350 units per milliliter against *Bacillus subtilis*.

EXAMPLE 2

*Streptomyces gangtokensis* No. 69249 (ATCC-15665) is cultured under shaking in a medium containing 2 percent of glucose, 1 percent of polypeptone, 1 percent of soybean flour and 0.5 percent of calcium carbonate at 28°C for 4 days. In the resulting culture broth, Gangtokmycin is produced and the broth shows antimicrobial activity of 350 units per milliliter against *Candida albicans* and of 150 units per milliliter against *Bacillus subtilis*.

EXAMPLE 3

*Streptomyces gangtokensis* No. 69249 (ATCC-15665 ) is cultured under shaking in a medium containing 2 percent of glucose, 3 percent of starch, 0.5 percent of polypeptone, 1 percent of soybean flour, 1 percent of cornsteep liquor, 0.5 percent of sodium chloride and 0.5 percent of calcium carbonate at 28°C for 2 days. 500 milliliters of the resulting culture broth are inoculated in 100 liters of a medium having the same constitution as described above and then cultured under agitation and aeration at 28°C for 3 days after addition of soybean oil as an antifoaming agent. This culture is filtered to obtain wet mycelia. The mycelia are subjected to extraction with the 3-fold quantity by weight of methanol. In the methanol extract, Gangtokmycin is contained and the extract shows antimicrobial activity of 7,500 units per milliliter against *Candida albicans*.

EXAMPLE 4

A mixture of 20 kilograms of wet mycelia of *Streptomyces gangtokensis* No. 69249 (ATCC-15665) prepared in the same manner as in example 3 and 60 liters of methanol is stirred for a day, and is then filtered to give filtrate. The filtrate is concentrated under reduced pressure at low temperature to give precipitates. The precipitates are collected by centrifugation, and washed thoroughly with water and then with pure acetone to give 25 grams of crude powder of Gangtokmycin. The crude powder shows antimicrobial activity of 1,500 to 3,500 units per milligram against *Candida albicans* and of 750 to 1,500 units per milligram against *Bacillus subtilis*. 20 grams of this crude powder are dissolved in 200 milliliters of 70 percent aqueous ethanol at room temperature and then the solution is filtered to remove insolubles. To the filtrate are added about 2 liters of acetone to give precipitates. The precipitates are washed thoroughly with acetone to give 13.5 grams of powder. This powder is dissolved in 250 milliliters of pure methanol and the methanol solution is filtered to remove insoluble jelly. To the filtrate are added 750 milliliters of acetone, and the precipitates thus obtained are separated. The precipitates show antimicrobial activity of 1,500 to 3,500 units per milligram against *Candida albicans and of* 750 to 1,500 units per milligram against *Bacillus subtilis*. To the filtrate are added 2.5 liters of petroleum ether, followed by filtration, and 5.5 grams of light yellow powder are obtained. This powder shows antimicrobial activity of 3,500 to 7,500 units per milligram against *Candida albicans and of* 1,500 to 3,500 units per milligram against *Bacillus subtilis*. The powder softens at 55°C and decomposes at about 75°C. the elementary analysis of this powder is C 63.7%; H 8.39%; N 1.34%.

EXAMPLE 5

10 grams of powder of Gangtokmycin prepared in the same manner as in example 4 are dissolved in 600 milliliters of 80 percent aqueous methanol solution under cooling and the solution is filtered to remove about 1.5 grams of insolubles. 200 milliliters of distilled water are added to the filtrate to give precipitates. The precipitates are collected by centrifugation and washed with pure acetone to give 4.5 grams of light yellow powder of Gangtokmycin. This powder shows antimicrobial activity of 3,500 to 7,500 units per milligram against *Candida albicans* and of 1,500 to 3,500 units per milligram against *Bacillus subtilis*. The elementary analysis of this powder is C 63.06%; H 8.78%; N 1.21%.

Having thus disclosed the invention, what is claimed is:

1. Gangtokmycin, metabolite of *Streptomyces gangtokensis* No. 69249 (ATCC-15665), which has the following characteristics:
   1. Its elementary analysis is C 63.06 to 63.70%, H 8.39 to 8.78% and N 1.21 to 1.34%;
   2. Its ultraviolet absorption spectrum is as shown on FIG. 2 of the accompanying drawing;
   3. Its infrared absorption spectrum is as shown on FIG. 1 of the accompanying drawing;
   4. It shows antimicrobial activity against gram-positive bacteria;
   5. Its specific rotation is $[\alpha]_D^{25} = 0°$ to $-13°$ ($c=0.5-1.0$, in aqueous pyridine containing 20 percent by weight of water);
   6. It is easily soluble in aqueous methanol, aqueous ethanol, aqueous acetone, aqueous dioxane, and aqueous pyridine, and soluble in N,N-dimethylformamide, pyridine, and acetic acid, and sparingly soluble in methanol, and ethanol, and insoluble or hardly soluble in water, pure acetone, ethyl acetate, chloroform, benzene, and petroleum ether.

2. A method for producing Gangtokmycin as defined in claim 1, which comprises culturing *Streptomyces gangtokensis* No. 69249 (ATCC-15665) in a medium containing assimilable carbon sources, digestible nitrogen sources and other nutrients necessary for the growth of the microorganism at a temperature of about 24°C to about 30°C under aerobic conditions until Gangtokmycin is substantially accumulated in the culture broth, and recovering the accumulated gangtokmycin therefrom.

* * * * *

UNITED STATES PATENT OFFICE
CERTIFICATE OF CORRECTION

Patent No. 3,678,161             Dated July 18, 1972

Inventor(s) MOTOO SHIBATA ET AL.

It is certified that error appears in the above-identified patent and that said Letters Patent are hereby corrected as shown below:

Column 1, immediately following the title, insert the following:

--This invention relates to a new antibiotic "Gangtokmycin" and to its microbiological production.

The invention is based on the observations:

(1) that there exist microorganisms capable of producing the new antibiotic;

(2) that the microorganisms capable of producing the antibiotic belong to the Series "Streptomyces hygroscopicus";

(3) that the antibiotic is accumulated when the microorganisms are cultured;

(4) that the so-accumulated antibiotic can be recovered in a desired purity from the culture broth, utilizing the physico-chemical properties of the antibiotic; and (5) that the antibiotic has strong antimicrobial activity against pathogenic Gram-positive bacteria, phytopathogenic fungi and yeasts.--

Signed and sealed this 9th day of January 1973.

(SEAL)
Attest:

EDWARD M. FLETCHER, JR.
Attesting Officer,

ROBERT GOTTSCHALK
Commissioner of Patents